United States Patent [19]
LaHay

[11] Patent Number: 5,940,932
[45] Date of Patent: Aug. 24, 1999

[54] MOBILITY SYSTEM FOR HEAVY MACHINERY RETROFIT

[76] Inventor: William P. LaHay, 1201 Office Park Rd. #805, West Des Moines, Iowa 50265

[21] Appl. No.: 08/907,873

[22] Filed: Aug. 11, 1997

Related U.S. Application Data

[60] Provisional application No. 60/023,847, Aug. 13, 1996.

[51] Int. Cl.$^6$ .................................................. B60B 33/00
[52] U.S. Cl. .................................................................. 16/30
[58] Field of Search .................................. 16/30, 32–34, 16/19, 18

[56] References Cited

U.S. PATENT DOCUMENTS

| | | | |
|---|---|---|---|
| 722,569 | 3/1903 | Dilger | 16/30 |
| 1,999,106 | 4/1935 | Muller | 16/32 |
| 2,521,819 | 9/1950 | Baer | 16/32 |
| 2,567,185 | 9/1951 | Coviello | 16/30 |
| 3,452,380 | 7/1969 | Walther | 16/30 |
| 3,463,505 | 8/1969 | German | 16/30 |
| 4,588,203 | 5/1986 | Anderson | 16/34 |
| 4,747,180 | 5/1988 | Screen | 16/32 |
| 4,772,035 | 9/1988 | Danial | 16/30 |
| 5,088,799 | 2/1992 | Redmon et al. | 16/30 |

*Primary Examiner*—Chuck Y. Mah
*Attorney, Agent, or Firm*—J. E. McTaggart

[57] ABSTRACT

A retro-fittable mobility kit enables one person alone to conveniently move a heavy machine such as wood or metal-working machine of the type that is originally designed to remain in a fixed location, and that normally would require special handling equipment and/or several persons available, should it become necessary to move the machine. The mobility kit includes (a) a pair of fixed wheel assemblies to be mounted on each side toward a first end of the machine, each having a wheel partially enclosed in a metal bracket, and (b) one front swivel caster wheel assembly that mounts onto a central location at the second end of the machine. A preferred embodiment provides an adjustable clamping system on each of the three assemblies for attachment onto a structural member such as bottom framework of the machine, a fixed wheel assembly on each the side toward the first end, and a swivel caster in a central location at the second end. The preferred embodiment also provides a foot-pedal-activated caster height selection mechanism that retracts and extends the swivel caster, and provides two strong rubber feet attached under the second end bracket ledge on which the second end portion of the machine rests when the swivel caster has been retracted. To make the machine mobile and maneuverable, the operator actuates the pedal by foot so as to extend the caster downwardly to an extended position, lifting the second end of the host machine off the rubber feet. To render the host machine stationary so it can be operated, the operator actuates the pedal in an opposite manner so as to retract the swivel caster and place the weight of the second end of the machine on the floor via the feet; the fixed side wheels remain on the floor at all times.

13 Claims, 3 Drawing Sheets

MOBILITY SYSTEM FOR HEAVY MACHINERY RETROFIT

PRIORITY

Benefit is claimed under 35 U.S.C, § 119(e) of pending provisional application 60/023,847 filed Aug. 13, 1996.

FIELD OF THE INVENTION

The present invention relates to the field of heavy fixed machines with bases that rest on the floor, such as woodworking table saws, radial arm saws and the like, and more particularly it relates to a universal wheel kit that enables an otherwise fixed machine to become mobile, that may be deployed with various types of machine bases or frames, that adds only a minimal amount to the working height, and that is easily set up in a stable condition for proper operation at a new location.

BACKGROUND OF THE INVENTION

Casters, i.e. swivel-mounted wheels, have long been known and used, sometimes in conjunction with fixed wheels, attached to furniture, suitcases, shopping carts and relatively light machines; they provide the ease of movement especially when there may be only one individual available to move the item. Heavier craftsmen's machinery such as wood- or metal-working machines are often designed to remain in a fixed location; however, due to inadequate space or for other reasons, such heavy machinery sometimes needs to be relocated. This can present great difficulty in the absence of an adequate handling crew and/or specialized moving equipment.

Thus there is an unfulfilled need for a retro-fit kit for providing mobility to heavy fixed machines that cannot be lifted and moved easily by one person.

DISCUSSION OF RELATED KNOWN ART

U.S. Pat. No. 3,478,381 to Schultz, U.S. Pat. No. 3,639,942 to Ostrom, U.S. Pat. No. 4,187,578 to Little and U.S. Pat. No. 4,459,920 to Cwik all disclose caster brackets assemblies that are applied to furniture. U.S. Pat. No. 4,424,604 to Dupuis discloses a wheel kit for a picnic table and the like, U.S. Pat. No. 4,707,881 to Van Hoye disclose a caster assembly for a suitcase and U.S. Pat. No. 4,940,252 to Seib discloses a removable container caster assembly with tow capability.

Casters are known to have been used for the purpose of making machines movable. One approach is to provide a metal-framed flat cart structure with wheels and/or casters attached; this approach is subject to the following disadvantages:

lifting the host machine onto and into the frame will likely require special equipment and/or more than one person for lifting and handling;

unless the cart has a specially recessed support structure, the cart can raise the working surfaces of the machine from the normal working height to an abnormally high level and make the machine inconvenient, difficult or even unsafe to operate;

any slight amount of play in the wheels and/or casters or a loose fit between the machine and the cart may destabilize the machine excessively, affecting its performance, accuracy and/or safety;

frame structure members surrounding the machine's base may obstruct dust-extraction ports on woodworking machinery; and due to the wide variety of machines that must be dealt with, frame structures must be made available in a range of sizes or else supplied in kit form with an assortment of various sized parts from which the user has to assemble the frame structure.

OBJECTS OF THE INVENTION

It is a primary object of the present invention to provide a mobility kit for attachment to the base of a heavy machine that normally remains in a fixed location, in order to allow the machine to be relocated conveniently.

It is a further object for the invention to enable one person to install the mobility kit on a heavy fixed machine, relocate the machine and set it up for operation, all without requiring special handling equipment or additional personnel.

It is a still further object for the invention to enable the machine operate in a stable manner and with minimal increase in height.

It is a still further object that a standard version of the mobility kit of the invention can be successfully deployed on a vide variety of different machines.

SUMMARY OF THE INVENTION

The abovementioned objects have been accomplished by the present invention of a retrofitting mobility kit for heavy fixed machines that includes three wheel assemblies that each provide a support ledge close to the floor level; two of the wheel assemblies have fixed wheels and are to be mounted to the sides of the machine; the third wheel assembly, to be located centrally at a first end of the machine, features a swivel caster to allow maneuverability.

In a preferred embodiment, the swivel caster is incorporated in a variable-height plunger mechanism that can be controlled by a foot pedal to transfer between (a) an operating mode where the caster is retracted so that the first end of the machine is supported by two rubber feet on the bottom side of the support ledge, and (b) a mobile mode where the first end of the machine is supported by the caster. The fixed side wheels remain on the floor at all times.

The wheel assemblies are provided with adjustable attachment means for attachment to a bottom frame of a machine; alternatively the wheel assemblies may be attached to machine structure by hardware fasteners such as machine bolts and nuts, supplemented, if necessary for particular machines, by additional struts or rails.

BRIEF DESCRIPTION OF THE DRAWINGS

The above and further objects, features and advantages of the present invention will be more fully understood from the following description taken with the accompanying drawings in which.

DETAILED DESCRIPTION

Figure 1B:
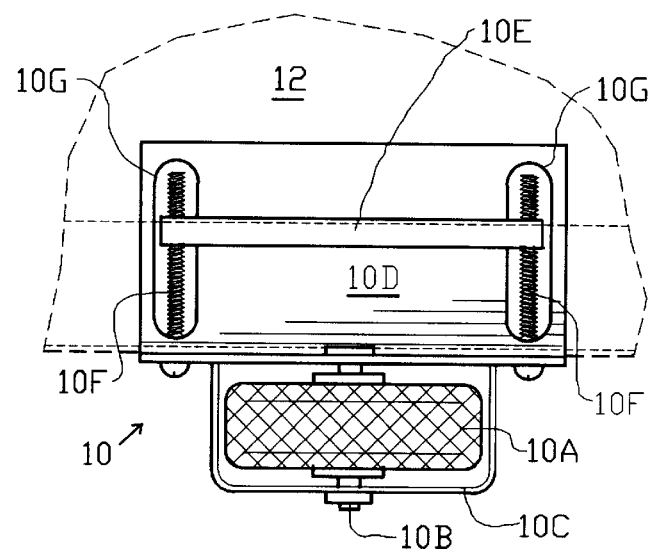
FIG. 1B is top view of the assembly of FIG. 1.
Figure 1A:
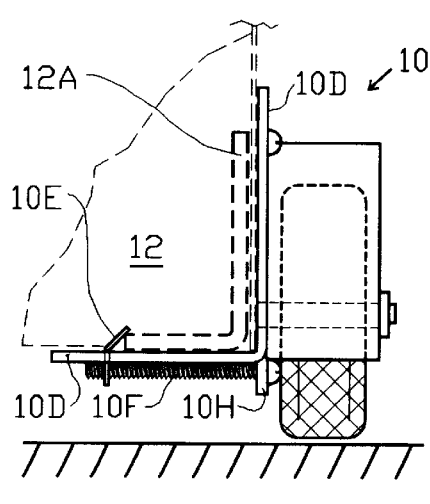
FIG. 1A a front elevational view of the assembly of FIG. 1.
Figure 1:
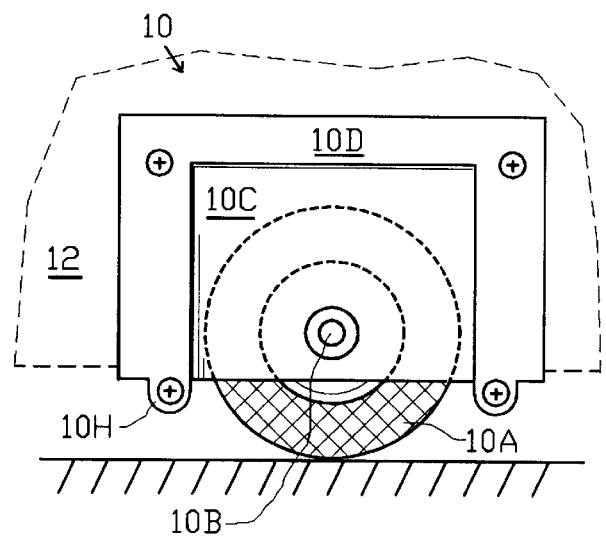
FIG. 1 is a side elevational view of one of pair of side wheel assemblies of the present invention showing, in broken lines, a partial outline of a host machine.

In FIG. 1, a side elevational view of one of pair of side wheel/housing assemblies 10 of the present invention, a partial outline of a host machine 12 is shown in broken lines. Wheel 10A is mounted on axle 10B that penetrates a housing channel 10C and a main plate 10D.

In FIG. 1A, a front elevational view of the side wheel assembly of FIG. 1, bracket 10D is configured as a vertical plate formed at the bottom to provide a horizontal ledge on which an angle bracket 12A of the base of host machine 12 is supported as shown. A clamp bar 10E is drawn against the edge of angle bracket 12A of the machine base (or other inside wall or ledge thereof) by a bolt 10F, one of two machine screws 10F that pass through holes at the bottom of bracket 10D and engage threaded holes in clamp bar 10E. Seats for the heads of machine screws 10F are provided by vertical metal tabs 10H which can be cut and formed from the material of bracket 10D itself as shown, or alternatively, tabs 10H could be welded on.

In FIG. 1B, a top view of the assembly of FIG. 1, housing 10C is shown in cross-section revealing wheel 10A and axle 10B, and the bottom ledge of main plate 10D is configured with 2 elongated slots 10G where tabs formed at both ends of clamp bar 10E extend downwardly through slots 10G to engage the two bolts 10F. Slots 10G provide a wide range of clamping adjustment to accommodate angle brackets (12A, FIG. 1A) of various widths. Clamp bar 10E can be made from 1/8" steel; the threaded holes at each end and bolts 10F can be 1/4" diameter, 20 threads per inch Referring generally to FIGS. 1, 1A and 1B, in an illustrative embodiment wheels 10A are made to be approximately 3" in diameter, nested inside U-shaped housing channels 10C which are welded to the outside of the vertical main plate 10D such that the open ends are oriented at the top and bottom. The wheels 10A extend approximately 3/4" below the bottom of the bracket ledge of main plate 10D. Axle 10B is made from steel, 3/8" diameter. Using a 3" wheel 10A, the length of the side wheel assemblies is approximately 5-1/2"; the height of the main plate 10D is approximately 3", and the lower ledge extends approximately 2-3/4" inward, under the machine base. The wheel offset adds between 3/4" and 1" to the machine's overall height.

Figure 2:
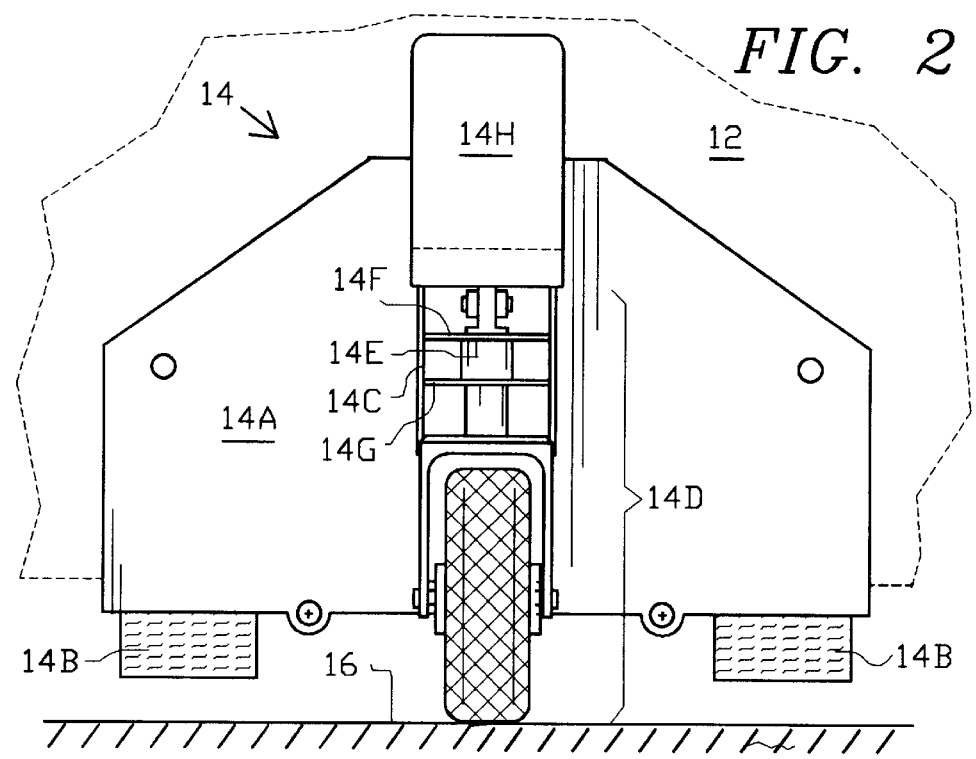
FIG. 2 is a front elevational view of a swivel caster wheel assembly of the present invention, to be utilized in conjunction with two side wheel assemblies as shown in FIG. 1.

FIG. 2 is a front elevational view of a swivel caster wheel assembly 14 of the present invention that is to be deployed on a host machine 12 in conjunction with two side wheel assemblies as shown in FIG. 1. The swivel caster wheel assembly 14 consists of a main plate 14A formed to provide a horizontal bottom ledge to which is attached a pair of rubber feet 14B, one at each end. Attached on front of main plate 14A is a U shaped swivel mount bracket 14C to which is mounted a conventional swivel caster 14D, supported in a bearing sleeve 14E secured by cross members 14F and 14G welded or otherwise secured in bracket 14C.

Swivel caster 14D can travel vertically in sleeve 14E and is linked to a foot pedal 14H in a toggle manner that enables foot pedal 14H to raise and lower swivel caster 14D relative to main plate 14A.

In the mobile mode shown in FIG. 2, swivel caster 14D is in its lower toggle position so that feet 14B are held up clear of the floor surface 16 and the weight of the front portion of host machine 12 is supported on the wheel of swivel caster 14D.

Figures 2A, 2B:
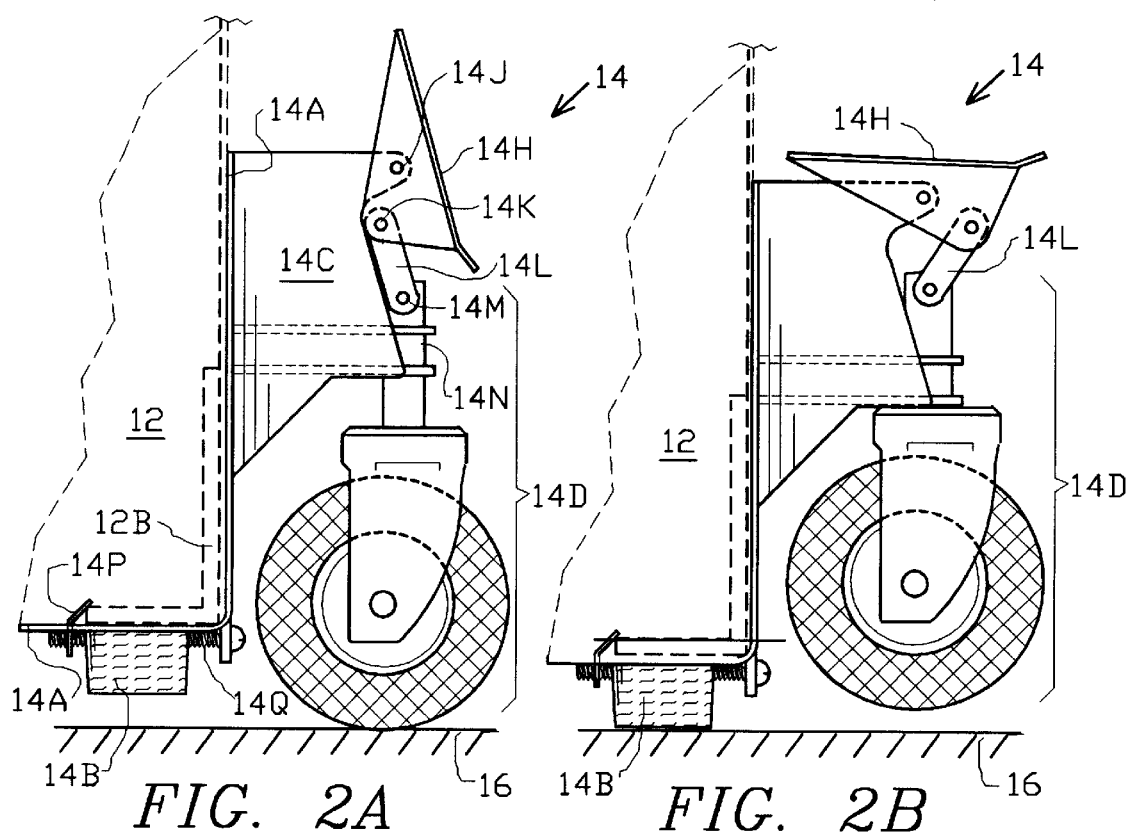
FIG. 2A is a side elevational view of the swivel caster wheel assembly of FIG. 2 showing the foot-operated toggle system actuated to deploy the mobile mode, and showing, in broken lines, a partial outline and cross-section of the host machine; the front wheel assembly.
FIG. 2B is a side elevational view of the swivel caster wheel assembly as in FIG. 2A but showing the foot-operated toggle system actuated to deploy the fixed operating mode.

FIG. 2A, a side elevational view of the swivel caster wheel assembly of FIG. 2, again shows the toggle system in the mobile mode, with foot pedal 14H in a substantially vertical position, pivoted to bracket 14C by a pin 14J and connected via a pin 14K, a link bar 14L and a pin 14M at the upper end of the shank 14N of swivel caster 14D. Link bar 14L may be implemented by a pair of strips, one on each side of caster shank 14N, or by a single bar that is made with a fork at the lower end to flank caster shank 14N.

The location and arrangement of the pivot points of pins 14J, 14K and 14M causes the weight of the front portion of host machine 12 to act on swivel caster 14D in a manner to positively retain it in its lower position supporting the weight of the front portion of host machine 12 on swivel caster 14D, with feet 14B suspended above floor surface 16 with adequate clearance as shown: the supported weight also acts to positively retain foot pedal 14H in the substantially vertical position shown, due to the relative locations of the pivot points in the linkage mechanism.

Clamp bar 14P extends nearly full length of shelf 14A, and is clamped onto angle bracket 12B of host machine 12 by means of two screws 14Q engaging tabs from clamp bar 14P extending downwardly through elongated slots configured in the bottom ledge of main plate 14A, so as to mount onto the host machine 12 in the same manner as shown in FIG. 1B for the side wheels: the only difference is dimensional, the swivel caster wheel assembly being larger than each side wheel assembly.

FIG. 2B is a side elevational view of the swivel caster assembly 14 as in FIG. 2A but showing the foot-operated toggle system actuated to deploy the fixed operating mode wherein foot pedal 14H has been actuated to the substantially horizontal position shown, where link 14L has lifted the caster 14D to its upper position, transferring the supported weight of host machine 12 to feet 14B which now rest on the floor surface 16, to provide solid support for operating the host machine 12. The wheel of caster 14D will remain suspended above floor surface 16 as shown only if there is sufficient friction or other means provided to suspend it; otherwise, with low linkage friction the wheel of caster 14D may rest lightly on the floor surface 16, while the feet 14B are supporting the full weight of the front portion of host machine 12 to provide working stability.

In the foregoing figures, all of the mounting brackets may be made from steel plate approximately 1/8" thick. The portion that affixes to the machine base may be bent into an L shape at a slightly acute angle, with the lower ledge of the L providing direct support for the machine base. A rubber gasket may be installed on the inside face of the L-bracket to provide clearance for hardware and to absorb vibration.

Figure 3:
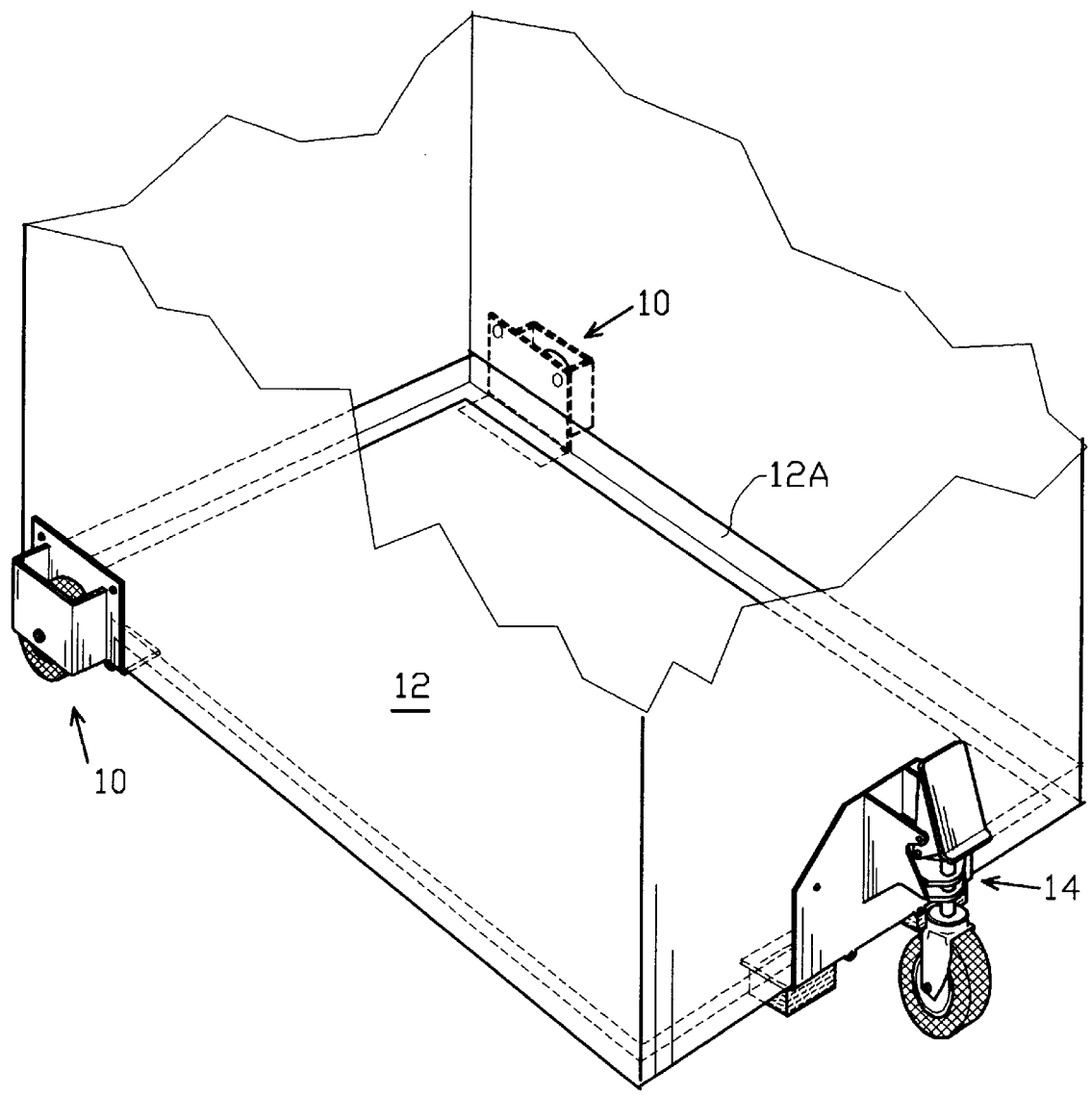
FIG. 3 is a perspective view showing two side wheel assemblies and a swivel caster wheel assembly of the present invention mounted onto a host machine, shown partially as an outline.

FIG. 3 is a perspective view showing two side wheel assemblies 10 mounted near a first end of host machine 12, shown partially as an outline, and a swivel caster wheel assembly 14 of the present invention mounted at a central region at the second end of host machine 12.

Installation of the wheel-mounting system of the present invention requires only that the machine 12 be blocked slightly off the floor (1" to 1.5"), preferably with wooden blocks that can be slid under the base as the machine 12 is propped up one corner or side at a time. A brief installation guide will instruct the user to place the blocks in clear areas that won't obstruct the desired placement of the brackets 10 and 14. When the machine 12 is blocked up at the adequate clearance off the floor, the user simply places the support ledge of each bracket under the machine base. The clamping bar 10E/14P must be retracted sufficiently to clear the bracket 12B, ledge or inside wall of the machine base, then tightened via the two machine screws 10F/14Q. Once that the first ensembles 10 at the first end and one swivel caster wheel assembly 14 at the second end are secured, the swivel caster 14D can be extended to assist in removing the wooden support blocks.

The three-wheel mobility kit of the present invention could be practiced in a number of variations of the configuration shown and described above as the illustrative embodiment.

For a more permanent installation, sheet metal screws and/or machine screws and nuts can be used to secure the top of each bracket and/or other regions thereof directly to the machine base, leg or other structure.

For particular machines, especially those not equipped with a base frame, clamping bars 10E/14P and the associated adjustment screws could be eliminated and the bracket could be bolted directly to structural members of the host machine such as a bottom frame, side panels, legs, etc. In some instances it may be necessary to provide from one to four support rails, erg. attached as structural members to bottom region of legs of the machine, forming a partial or full base frame.

For host machines equipped with legs, a support frame could be made from metal or plywood and fitted with the two side wheel assemblies and the caster assembly as described, these being attached using either the clamp system as described or attaching the assemblies to the support frame, eliminating the clamp bar and associated screws.

Instead of configuring the swivel caster wheel assembly mechanism to operate in the bistable variable-height plunger manner described, there exists an option of eliminating the rubber feet 14B, mounting the swivel caster 14D in a simple manner at a fixed level and equipping it with a known type foot-operated caster lock system that locks against both wheel rotation and swivel rotation. However, depending on the machine and type of work performed, even a small amount of play can be unacceptable. Some additional stability may be obtained by also equipping the two fixed side wheels assemblies with a known type of foot-operated locking brake to prevent wheel rotation.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A mobility kit for retro-fitting onto a host machine that is normally supported on a floor by means of structural members in a base region thereof, comprising:
   a pair of fixed wheel assemblies constructed and arranged to be each attached to a corresponding one of two structural members of the host machine, located one on each opposite side of a first end portion thereof, and to each provide an inwardly-extending ledge, disposed close to a floor level, adapted to support a corresponding portion of the host machine at the first end thereof via a corresponding structural member of the machine so as to provide the first end portion with mobility via said fixed wheel assemblies wherein each one of said pair of fixed wheel assemblies comprises:
      a metal wheel-mounting angle bracket formed as a vertical plate with the ledge formed as a horizontal flange extending in an inward direction at a lower edge of the vertical plate;
      an axle affixed to the vertical plate of said wheel-mount angle bracket above the ledge and extending horizontally outwardly therefrom;
      a wheel mounted on said axle so as to be rotatable thereon; and
      attachment means for securing said angle bracket to a corresponding structural member of the host machine in a manner to locate the vertical plate against a side surface thereof and to locate the ledge in a supportive disposition under the structural member in a side region at the first end of the machine; whereby said wheel is caused to support weight from a corresponding first end portion of said host machine and thus provide mobility thereto; and
   a swivel caster wheel assembly, disposed centrally at a second end of the host machine, opposite the first end, constructed and arranged to be attached to a corresponding structural member of the host machine, and to provide an inwardly-extending ledge adapted to support a corresponding second end portion of the host machine and to thus mobilize the second end portion of the host machine in a maneuverable manner.

2. The mobility kit as defined in claim 1, further comprising, in each one of said pair of fixed wheel assemblies, a U-shaped metal bracket attached to the vertical plate of said wheel-mounting angle bracket in a manner to define a vertical channel partially enclosing said wheel, said U-shaped metal bracket being configured with a cylindrical opening configured and arranged to engage said axle and to serve as a bearing providing end support to said axle.

3. The mobility kit as defined in claim 1, wherein said attachment means for said pair of fixed wheel assemblies is implemented by an adjustable clamping mechanism comprising:
   a clamp rail located on top of the ledge thereof near an edge region thereof, running nearly full length of the ledge, and configured with a downward tab at each end having a tapped bore, the ledge being configured with a pair of elongated lateral adjustment travel slots dimensioned to allow the tabs to extend downwardly through the ledge so as to locate the tapped bore therebeneath; and
   a pair of adjustment screws each supported at a head end thereof by a corresponding one of a pair of support lugs extending downwardly from a bottom edge of the vertical plate in a circular opening configured therein, and each engaged at a threaded end thereof with a corresponding one of the tabs via the tapped bore thereof;
   whereby said pair of fixed wheel assemblies can be secured to a corresponding structural member by tightening said screws so as to clamp the structural member between the clamp bar and the vertical plate, the clamp bar being provided with a range of accommodation and adjustment defined by the travel slots in the ledge.

4. The mobility kit as defined in claim 1 wherein said swivel caster wheel assembly comprises:
   a metal swivel-mounting angle bracket formed as a vertical plate with a horizontal ledge running along a bottom edge thereof and extending inwardly from the bottom edge;

bearing support means affixed to an outwardly-facing side of the vertical plate of said swivel-mounting angle bracket;

swivel bearing means supported by said bearing support means;

a swivel caster, having a wheel supported by a pair of forkplates attached in a swivel manner to an upwardly-extending vertical mounting shaft engaging said swivel bearing, so as to cause said swivel caster to support weight from a corresponding portion of the host machine at the second end thereof and thus provide mobility and maneuverability thereto; and attachment means for securing said angle bracket to a structural member in a first end region of the machine in a manner to support weight of a corresponding portion of the host machine on the ledge and to secure the vertical plate against a vertical surface of the host machine in the second end region thereof.

5. The mobility kit as defined in claim 4, wherein said swivel bearing means comprises a cylindrical sleeve bearing having a vertical bore dimensioned to provide a sliding fit with the mounting shaft of said swivel caster.

6. The mobility kit as defined in claim 5, wherein said bearing support means comprises a pair of vertical metal sideplates attached to a central region of the vertical plate of said swivel-mounting angle bracket, flanking and affixed to said sleeve bearing.

7. The mobility kit as defined in claim 6 wherein said swivel caster wheel assembly further comprises:

height selection means, cooperating with said swivel bearing means and said swivel caster, constructed and arranged to enable a user to select between a raised position of said swivel caster providing a fixed operating mode and a lowered position of said swivel caster unit providing a mobile mode.

8. The mobility kit as defined in claim 7, wherein said height selection means comprises:

a foot-operated lever, pivotably attached to an upper region of said metal sideplates that flank said sleeve bearing at a first pivot point, configured and arranged to have a range of rotation travel between a substantially vertical position and a substantially horizontal position;

link bar means having a lower end pivotably attached to an upper end region of the shaft of said swivel caster defining a second pivot point and an upper end pivotably attached to said foot-operated lever at a third pivot point; and the locations of the first pivot point in said metal sideplates, the second pivot point in the shaft of said swivel caster, and the first and third pivot point in said foot-operated lever being made such that (a) in the lowered position, the third pivot point is closer to the vertical plate of said swivel-mounting angle bracket than a line drawn between the first and second pivot points and (b) in the raised position, the third pivot point is further from the vertical plate than the line drawn between the first and second pivot points;

whereby said height-selection means is enabled to be actuated by foot in a detented toggle manner to select between the lowered position and the raised position of said swivel caster.

9. The mobility kit as defined in claim 8 wherein said swivel caster wheel assembly further comprises;

a pair of feet implemented as blocks, attached against a bottom surface of the horizontal ledge of said swivel-mounting angle bracket, one at each end thereof, said feet being dimensioned, structured and arranged to operate in conjunction with said height selection means so as to (a) bear onto a floor surface and support weight of a corresponding second end portion of the host machine when said height selection means is actuated to select the raised position of the swivel caster unit, thus providing a stable fixed mode for operating the host machine, and (b) transfer the weight of the second end portion of the machine to said swivel caster when said height selection means is actuated to select the lowered position of the swivel caster unit, thus providing, in conjunction with said pair of fixed wheel assemblies, a mobile and maneuverable mode for moving the host machine.

10. The mobility kit as defined in claim 1 wherein said pair of fixed wheel assemblies each further comprise:

a U-shaped metal bracket attached to the vertical plate of said wheel-mounting angle bracket in a manner to define a vertical channel enclosing said wheel, said U-shape metal bracket being configured with a cylindrical opening configured and arranged to engage said axle and to cooperate therewith in a manner to act as a bearing providing end support to said axle;

a clamp rail located on the ledge near an edge thereof, running nearly full length of the ledge, and configured with a downward tab at each end having a tapped bore, the ledge being configured with a pair of elongated lateral adjustment travel slots dimensioned to allow the tabs to extend downwardly through the ledge so as to locate th e tapped bore therebeneath;

a pair of adjustment screws each supported at a head end thereof by a corresponding one of a pair of support lugs extending downwardly from a bottom edge of the vertical plate in a circular opening configured therein, and each engaged at a threaded end thereof with a corresponding one of the tabs via the tapped bore thereof;

whereby said pair of fixed wheel assemblies and said swivel caster wheel assembly can be removably attached to a corresponding portion of a corresponding structural member by tightening said screws so as to clamp the frame of the machine between the clamp bar and the vertical plate, the clamp bar being provided with a range of accommodation and adjustment defined by the travel slots in the ledge.

11. The mobility kit as defined in claim 1 wherein said swivel caster wheel assembly comprises:

a metal swivel-mounting angle bracket formed as a vertical plate with a horizontal ledge running along a bottom edge thereof and extending inwardly from the bottom edge;

a pair of vertical metal sideplates attached to a central front region of the vertical plate of said swivel-mounting angle bracket, extending outwardly therefrom;

a cylindrical sleeve bearing having a vertical bore affixed between said pair of vertical metal sideplates;

a swivel caster, having a wheel attached in a swivel manner to an upwardly-extending vertical mounting shaft engaged in said sleeve bearing, dimensioned to provide a sliding fit therebetween, said swivel caster being constructed and arranged to support weight from a corresponding second end portion of said host machine and thus provide mobility thereto;

a clamp rail located on the ledge near an edge thereof, running nearly full length of the ledge, and configured with a downward tab at each end having a tapped bore, the ledge being configured with a pair of elongated lateral adjustment travel slots dimensioned to allow the tabs to extend downwardly through the ledge so as to locate the tapped bore therebeneath; and a pair of adjustment screws each supported at a head end thereof by a corresponding one of a pair of support lugs extending downwardly from a bottom edge of the vertical plate in a circular opening configured therein, and each engaged at a threaded end thereof with a corresponding one of the tabs via the tapped bore thereof;

whereby said pair of fixed wheel assemblies and said swivel caster wheel assembly can be removably attached to corresponding structural members by tightening said screws so as to clamp the structural member between the clamp bar and the vertical plate, the clamp bar being provided with a range of accommodation and adjustment defined by the travel slots in the ledge.

12. The mobility kit as defined in claim 11 further comprising:

height selection means in said swivel caster assembly, constructed and arranged to enable a user to select between a raised position of said swivel caster unit providing a fixed operating mode and a lowered position of said swivel caster unit providing a mobile and maneuverable mode.

13. The mobility kit as defined in claim 12, wherein said height selection means comprises:

a pair of feet implemented as blocks attached against a bottom surface of the horizontal ledge of said wheel-mounting angle bracket, one at each end thereof, dimensioned, structured and arranged to operate in conjunction with said height selection means so as to (a) bear onto a floor surface and support weight of a corresponding second end portion of the host machine when said height selection means is actuated to select the raised position of the swivel caster unit, thus providing a stable fixed mode for operating the host machine, and (b) rise to a clearance dimension above the floor surface when said height selection means is actuated to select the lowered position of the swivel caster unit, so as to cause said swivel caster unit to support the weight of the second end portion of the host machine, thus, in cooperation with said pair of fixed wheel assemblies, providing a mobile and maneuverable mode for relocating the host machine;

a foot-operated lever, pivotably attached to an upper region of said metal sideplates that flank said sleeve bearing at a first pivot point, configured and arranged to have a rotation travel range between a substantially vertical position and a substantially horizontal position;

a link bar having a lower end pivotably attached to an upper end region of the shaft of said swivel caster defining a second pivot point and an upper end pivotably attached to said foot-operated lever at a third pivot point; and the locations of the first pivot point in said metal sideplates, the second pivot point in the shaft of said swivel caster, and the first and third pivot point in said foot-operated lever being made such that (a) in the lowered position, the third pivot point is closer to the vertical plate of said swivel-mounting angle bracket than a line drawn between the first and second pivot points and (b) in the raised position, the third pivot point is further from the vertical plate than the line drawn between the first and second pivot points;

whereby said height-selection means is enabled to be actuated by foot in a detented toggle manner to select between the lowered position and the raised position of said swivel caster.

* * * * *